Nov. 23, 1965 G. P. RUTELLI 3,219,954
SURFACE WAVE TRANSMISSION SYSTEM FOR TELECOMMUNICATION
AND POWER TRANSMISSION
Filed Sept. 30, 1963 2 Sheets-Sheet 1

INVENTOR.
Giovanni P. Rutelli
BY
ATTORNEY

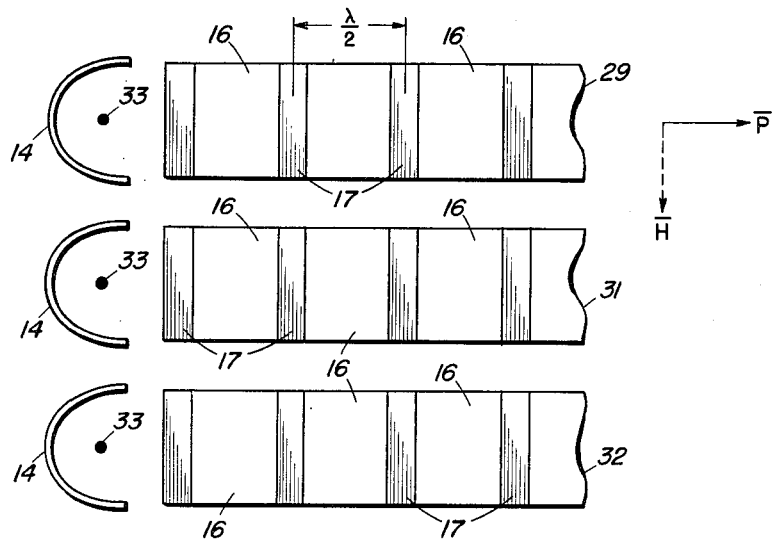
FIG. 5
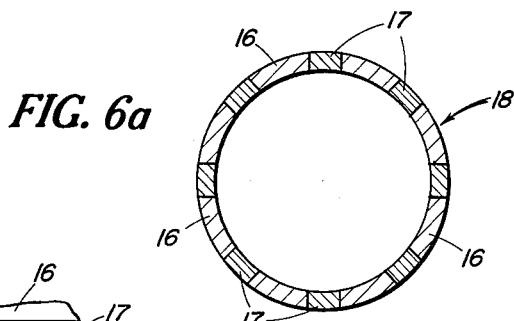
FIG. 6a
FIG. 6b
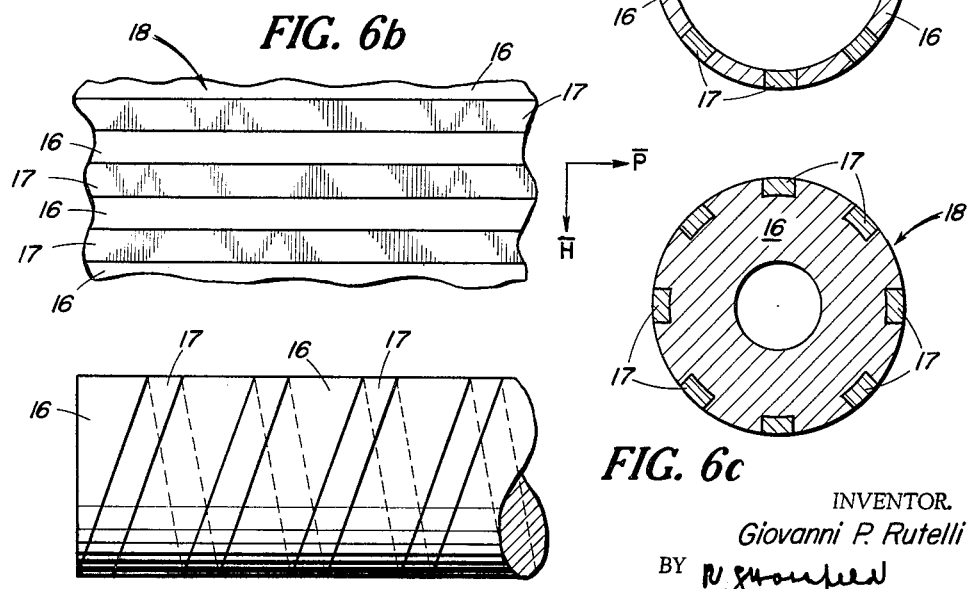
FIG. 6c
FIG. 6d
INVENTOR.
Giovanni P. Rutelli
BY
ATTORNEY

United States Patent Office

3,219,954
Patented Nov. 23, 1965

3,219,954
SURFACE WAVE TRANSMISSION SYSTEM FOR TELECOMMUNICATION AND POWER TRANSMISSION
Giovanni P. Rutelli, 7206 Dartmouth Ave., College Park, Md.
Filed Sept. 30, 1963, Ser. No. 312,802
Claims priority, application Italy, May 31, 1957, 8,235/57, Patent 572,377
11 Claims. (Cl. 333—95)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of Serial No. 738,681 filed May 29, 1958, now abandoned.

The present invention relates to transmitting systems and more particularly to systems and methods for telecommunication and electrical power transmission.

The present techniques of transmitting electrical waves in conventional systems are by guided waves along wires or coaxial cables (induction fields) and by radio electromagnetic waves traveling in unbounded or in bounded spaces. In both cases high frequencies and low voltages are used for telecommunication purposes. The transmission of power in usable amounts at present is achieved only by wires or cables wherein the power is transmitted at a low frequency and high voltages with guided waves of induction fields only. In radio transmission the very modest concentration of power commonly reached in the propagating medium does not allow the transferral of large amounts of power and does not obtain efficiencies beyond very limited values. Further, conventional radiating fields do not result in high power densities in the dielectric, as is obtained by the induction fields existing between the conductors of conventional power lines, even if frequencies are used that generate strong ground waves.

My invention takes advantage of the properties of both guided and radiated waves in such manner that it is possible in the case of power transmission to reach an energy-density in the free space capable of assuring communications with high and very high efficiency of transmission of electrical power provided proper values of frequency and voltage are selected with suitable forms and properties of all employed components also related to the radiating and receiving antennas. A basic and important element of the invention is the use, in the case of power transmission, of a new and novel artificial earth or ground disposed and arranged in strips disposed between the transmitting station and the receiving station, and in the case of telecommunications, of a special open wave guide having a proper structure of the guiding surface.

To facilitate understanding of the invention, brief consideration is now given to the electromagnetic field outside and inside of a conductor or conductors. For any conductor devoted to the transmission of electricity, small amounts of power for telecommunication and for radio-transmission of intelligence including high-frequency wire-transmission of radio messages, and considerable power for industrial purposes, it is possible to locate at each point M in the dielectric surrounding the conductor, and in each instant, an electric vector $\bar{E}$ and a magnetic vector $\bar{H}$ perpendicular to each other and to the direction of the propagation of the energy. These vectors represent and allow the calculation of, respectively, the concentration of electric energy in the amount given by $\epsilon_0 E^2/2$ and of magnetic energy given by $\mu_0 H^2/2$ where $\epsilon_0$ and $\mu_0$ are respectively, the dielectric and magnetic constants of the medium. It is further possible to locate at each point M in the dielectric outside the conductors a third vector $\bar{P}$ perpendicular to the plane of $\bar{E}$ and $\bar{H}$ which represents the direction and the amount of the total power $$\frac{dW}{dt}=P \qquad (1)$$

crossing a unit area of the above mentioned plane. Finally, it is possible to locate at each instant three similar vectors $\bar{E}$, $\bar{H}$, and $\bar{P}$ at each point M* inside each conductor of a transmission line as well as of a radio antenna or of the earth. These vectors correspond to or are representative of lost energy. In the case of guided energy the vector $\bar{P}$, the Poynting vector, is substantially directed along the mentioned conductors (longitudinal transmission). In particular instances, the vector $\bar{P}$, or a component of it, is directed outside or inside the surface and corresponds to energy leaving the same surface. This situation arises, e.g., when energy spreads out of the conductor (radial outflow of energy). A conspicuous example of this phenomenology is given by a linear antenna which guides energy for a portion of its length and delivers energy to the free space for the remaining portion.

In any case and in each portion of surface S normal to the direction of propagation:

$$\bar{P}=\bar{E}\times\bar{H} \qquad (2)$$

$$W=\int_s P ds = \epsilon_0 \frac{E^2}{2}+\mu_0 \frac{H^2}{2} \qquad (3)$$

where $\epsilon_0$ and $\mu_0$ are respectively the electric and magnetic constants of the medium supposed the free space.

To reach high values of $\bar{P}$ and W it is necessary to increase $\bar{E}$ and $\bar{H}$, and each action increasing $\bar{E}$ (or $\bar{H}$), at the same time increases $\bar{H}$ (or $\bar{E}$), insofar as each of these vectors represents a different physical aspect of, and coexists to the other.

In radio transmission the far field of the surface-wave at distance D from the transmitter, with a radiated power $P_{rad}$, is for a single wire vertical antenna, given by $$E=K\frac{\sqrt{P_{rad}}}{D}S_0(d_n) \qquad (4)$$

where K depends upon the wave-distribution on the antenna and $S_0$ ($dn$) is a damping factor given in function by the numerical distance $dn$ of Sommerfeld.

If a directive (beam) transmitting system is used, such as, for example, a plurality of cylindrical parabolic reflectors (FIG. 5) with rectangular apertures arranged side by side, with their vertical axes parallel, and with a linear antenna located on the focus-line of each reflector, the transmitted power will be directed in a single, essentially horizontal direction. As will become apparent hereinafter, it is possible to increase the gain of a given number of reflectors without the use of extra elements, or conversely, it is possible to reach a pre-assigned radiated power with a fewer number of reflectors.

It is an object of the present invention to provide a new and novel means and method for transmitting electrical energy of guided radio waves for power engineering purposes.

Another object of the present invention is the provision of a system and method for the transmission of electrical energy of radio guided waves for communication purposes by means of an artificial or semi-artificial earth. The aforementioned goals are respectively accomplished by the use of a plane acting as an open wave guide and by means of an isolated single wire (open) wave guide put at some level above the ground.

As will be disclosed hereinafter, the latter system, being dependent upon the structure of the composite metallic surface, can operate as a wave guide or as an end fire-array, or as an equivalent broadside-array. As far as the former system is concerned, i.e. the system for power transmission, the employment of LF, MF, or HF, can be utilized, while as far as the latter system is concerned, i.e., the open wave guide, the employment of VHF or UHF can be utilized.

In other words, the open single conductor wave guide can be arranged in such a way as to convey energy to an extremity load or to spread energy axially through the medium, or depending upon the surface composition, the energy can be made to spread out laterally in a broadside array-mode.

Other objects and many of the attendant advantages of the invention will be readily appreciated as the same becomes better understood by reference to the following detailed description when considered in connection with the following mathematical development and the accompanying drawings wherein:

FIG. 5 is a partial top view of the invention showing a plurality of transmission channels;

FIG. 6a is the cross-sectional view of a cylindrical open wave guide having strips of special magnetic materials;

FIG. 6b is a plan view of a portion of the cylinder of 6a having conductive and magnetic strips disposed thereon; and FIGS. 6c and 6d are views of physical modifications of the open wave guides shown in FIGS. 6a and 6b.

Figure 1:
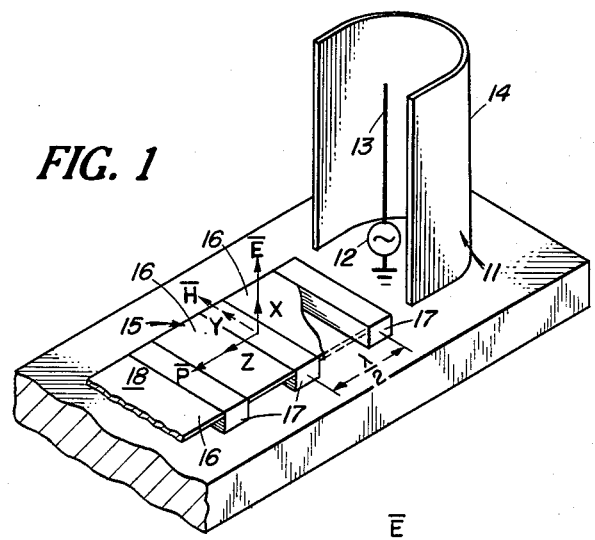
FIG. 1 is a perspective view showing the elementary system for power transmission.

The fundamental concept of the invention lies in the employment of an artificial or semi-artificial ground functioning as an open wave guide disposed above the earth's surface or inside the earth's surface at some convenient level whereby there is produced by the artificial ground and in its proximity a bounding of the radiated field in the desired direction and, additionally, a wave guide effect for the radiated field. By reason of the invention it is possible to obtain transmission of energy with a field level sensibly higher than that obtained by conventional systems.

The wave guide effect results from two special properties incorporated or provided in the artificial earth, namely, a magnetic property and an electrical property as will be more thoroughly explained hereinafter. By reason of these special properties, electromagnetic waves may be guided, inter alia, in any desired direction by the artificial earth which extends from substantially the transmitting station to the receiving station. Until the present time the prior art has been concerned only with the electrical properties of conductors in wire transmission and of a good conducting earth in radio transmission. In the present invention I utilize and combine in a new and novel manner both electrical and magnetic properties of an artificial earth or of an isolated cylindrical or prismatic (e.g. having rectangular cross sections) open-wave guide. The artificial earth may be produced in two different basic ways. First, by treating the natural ground, and secondly, by constructing a truly artificial earth above the earth's surface. To facilitate visualization of the way in which the artificial earth operates reference is now made to the first case. In this case the conductivity of relatively narrow strips of natural earth (FIG. 3) may be increased in any suitable manner such as, for example, by mixing a metallic conductive dust in sufficient quantity with the natural earth. By increasing the conductivity of the natural earth in the desired direction of transmission, the power lost due to current in the earth may be reduced and at the same time the image atennas of the transmitting system will radiate in phase with corresponding real ones. The magnetic property may be provided in a substantially similar manner, such as, for example, by mixing a ferromagnetic dust of suitable material (e.g., ferrite or the like) with natural earth and disposing this treated earth, or solid magnetic material, in trenches or channels disposed longitudinally with respect to or at right angles with the direction of transmission and separated by a distance equal to, for example, one-half the wave length or a submultiple of one-half the wavelength of the transmitted wave. The effect of increasing the magnetic permeability of a part of the earth in this manner provides a bounding effect of the radiating field. Further, if desired, the upper surface of the conductive portion of the artificial earth may be shaped to provide transversely or longitudinally disposed grooves or the like to cause the lines of the electromagnetic field to form sensibly a transverse-magnetic mode, thus increasing the tendency of a ground wave to follow the earth's surface and minimize the portion of radiation dispersed into space. It is to be further noted that the provision of increased permeability and the related surface reactance of the earth tend to decrease the phase velocity of the wave to a value less than the velocity of light, which is a condition for the guiding effect of the artificial earth.

It may now be apparent that a truly artificial earth may be provided in accordance with the teaching hereinabove by providing on or below the earth's surface a structure comprised of a layer or strip of material having a high electrical conductance and transversely (FIG. 1) or longitudinally (FIG. 4) disposed magnetic elements having a high permeability and separated apart a predetermined distance as indicated hereinabove if a non-uniform distribution of permeability is desired or tolerated.

With reference now to FIG. 1 there is diagrammatically shown a directive or beam antenna system 11 comprised of a generator 12 for supplying current to an antenna 13 located on the focus line of a vertically disposed parabolic reflector 14 for directing the transmitted energy from the antenna 13 in the desired direction. It is to be understood that any suitable antenna system may be used and it is not intended that the invention be limited to that shown and described herein. Disposed and arranged in the direction of propagation $\overline{P}$ of the transmitted energy from the antenna 13 is an artificial earth 15 comprised of plurality of strips or layers 16 or conductive material having high electrical conductance. The maximum width of the strips 16 is not critical but should be constant and preferably at least as wide as the beam of transmitted energy throughout its length which extends substantially from the transmitting station to the receiving station. In contact with and at the same level of the strips 16 and transversely (FIGS. 1 and 5) thereto are a plurality of magnetic members 17 of suitable material having a relatively high permeability and separated a distance of a submultiple of one-half the wave length or one-half the wavelength of the transmitted signal and, in any case, a distance as may be suitable and determined by the frequency of the signal to be transmitted. The orientation of the vectors $\overline{E}$, $\overline{P}$, and $\overline{H}$, with relation to the artificial earth is also shown, the vector $\overline{E}$ being substantially perpendicular to the top surface (interface) the vector $\overline{H}$ being perpendicular to $\overline{E}$ and substantially parallel with magnetic members 17, and the vector $\overline{P}$ being substantially perpendicular to the plane ($\overline{E}$, $\overline{H}$), i.e., at right angles to the magnetic members 17.

Figure 2:
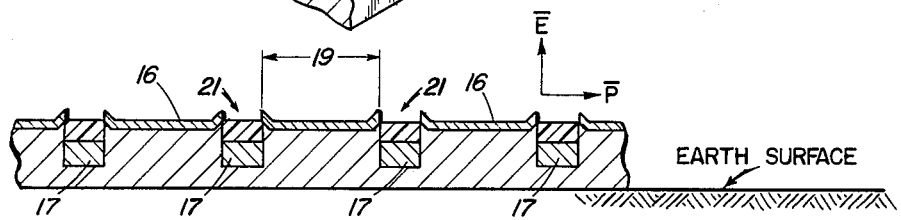
FIG. 2 is a side view partially in section of one embodiment of the artificial earth.
Figure 3:
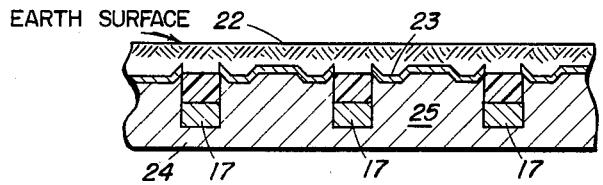
FIG. 3 is a side view partially in section of another embodiment of the artificial earth.
Figure 4:
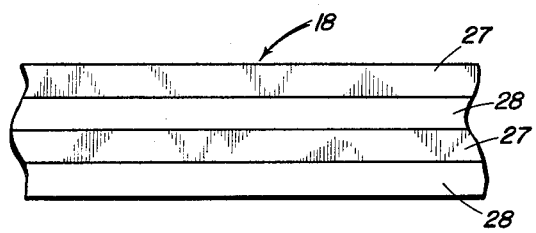
FIG. 4 is a top view of a plane portion of the artificial earth having longitudinally extending adjacent conductive and magnetic strips.

A diagrammatic representation of a truly artificial earth is shown in FIG. 2 wherein the interface has a special geometric configuration as distinguished from the flat upper surface 18 of the interface shown in FIG. 1. As shown in FIG. 2, a relatively thin strip 1% of electrically conductive material such as, for example, copper or the like, is provided with transversely disposed spaced apart groove intervals 19. Arranged and disposed transversely below or at the same level of the strips are flux concentrating magnetic members 17 comprised of a suitable magnetizable material, one each being located, for example, immediately below each non-metallic ridge 21. Each section 17 may be held in spaced relationship with, or if desired, in lateral contact with, the strip 16 of conductive material. It is preferable, however, that the magnetic sections 17 be located or embedded in a suitable medium having laterally good conductive properties. As indicated hereinbefore the artificial earth as shown in FIGS. 2, 4, and 5 may be constructed on the surface of the earth or embedded therein if desired (FIG. 3). Although a specific and detailed description of the construction of the artificial earth has not been given, workers skilled in the art will readily be able to construct a suitable and operable artificial earth in conformance with the teaching contained herein, particularly in view of the fact that the invention is not considered limited to details of construction.

A diagrammatic representation of a semi-artificial earth is shown in FIG. 3 wherein the semi-artificial earth is located below the surface 22 of the ground and is provided with an upper surface 23 generally similar to that shown in FIG. 2 although it is to be understood that other geometric configurations such as, for example, corrugation, which may be used if desired. In the embodiment as shown in FIG. 3 the earth may be excavated to a suitable depth 24 and a portion 25 thereof treated to increase its conductivity and thereafter replaced to a suitable height and to form surface 23. The transversely disposed magnetic sections 17 may be formed in a similar manner, the ground in this case being treated to increase its magnetic permeability and then replaced to form transverse channels or sections 17 spaced apart and covered by the portion 25 as described hereinbefore. Thereafter the upper surface 23 of the conductive strips may be formed as described hereinbefore and covered with untreated or treated earth. It is to be particularly noted that although the distance between the magnetic sections 17 is preferably determined on the basis of the frequency of the transmitted signal, for the case where a non-concentrated distribution of magnetic material takes place, e.g. a diffused magnetization of the earth, there is no necessity for a distribution pattern based on wave frequency. This same general procedure may also be conveniently used to provide an electrically conductive medium of the portions 16 of an artificial earth of the type shown in FIG. 2.

FIG. 4 shows another embodiment of the artificial earth wherein the guiding interface 18 is comprised of alternative strips of substantially longitudinally extending magnetic material 27 and conductive material 28, respectively. It should be understood that the location of the artificial earth of this type may be located in plane form either upon the surface of the earth (FIG. 2) or at a reasonable depth beneath the surface of the earth (FIG. 3). Other modifications could include the disposition of the strips in zig-zag or sinusoidal configurations or the like should such be deemed advantageous to the construction or operation thereof.

FIG. 5 shows an arrangement for a plurality of channels 29-31-32 having the same or different frequencies and which need not extend in the same direction or be straight. As shown diagrammatically in FIG. 5 electric energy of a suitable frequency is radiated from an antenna 33 for each channel and beamed toward its respective artificial earth comprising a conductive layer 16 and transversely disposed magnetic sections 17 as described hereinbefore.

FIG. 6a shows another type of wave guide which is based on the same concept of the operation of the artificial earth and is similar in construction to the same artificial earth shown in FIG. 4 wherein the electrically conductive layer 16 is provided with a flat upper surface 18 (FIG. 6b) as shown in FIG. 4 and a suitable thickness as may be determined by its specific use. Alternatively disposed beside a conductive layer 16 and in contact therewith are magnetic sections 17 comprised of any suitable material or combination of materials resulting in a high and uniformly distributed magnetic permeability throughout the magnetic strips 17.

FIG. 6a shows the cross section of a cylindrical wave supporter (wave guide or radiator in the meaning hereinabove set forth) wherein magnetic strips 17 are equidistributed about the periphery and extending longitudinally in the desired direction of propagation. Alternatively to the above mentioned magnetic strips 17, corresponding longitudinal extending conductive strips 16, which may or may not have the same cross-sectional dimensions of the magnetic strips 17, are positioned. For example, the conductive material 16 can include the entire center portion of the wave supported or conversely, it could consist of a hollowed-out shell with magnetic strips 17 disposed about the periphery (FIG. 6c). It results in any case, however, that the interface 18 is comprised of alternatively disposed magnetic material 17 and conductive material 16 preferably in electrical contact which precludes any air gaps therebetween. Furthermore, as in the case of FIG. 4, the physical configuration can take various other forms, e.g. the magnetic strips 17 and conductive strips 16 could be wound in the form of a helix (FIG. 6d) around a mechanical supporting core or inner cable without materially modifying the essential physical properties of the wave supporter.

FIG. 6b shows the plane development of the cylindrical wave supporter of FIG. 6a. By a plane development of the cylindrical wave supported is meant the cutting along a generatrix by a longitudinal-diametral plane and spreading it out to form a flat surface (FIG. 6b). Such a plane development of the cylindrical wave supporter of FIG. 6a, when considered geometrically, results in a waveguide extending in a horizontal plane in the desired direction of wave propagation. Furthermore, FIG. 6b can be considered as representing the surface of a cylinder having an infinite radius.

Both the artificial earth (FIGS. 1-5) and the cylindrical wave supporter (FIG. 6) can be considered open wave-guides.

It may now be obvious that it is necessary to select a frequency range to suit each special purpose of my proposed system such as, for example, telecommunications or other types of transmission. In any case the new system is more advantageous from the view points of reliability and economy relative to overhead lines or conventional antennas for which no magnetic action can be adapted. It should be further noted that the new system can be adapted for transmission on long waves or middle waves as well as for radio techniques at the frequency determined to be the most suitable for each purpose.

To further facilitate understanding of the invention there will now be presented a mathematical analysis of the operation of the artificial earth as an open waveguide. The electromagnetic energy in free space will now be considered when the related waves are guided along the interface (surface) comprised of a conductive strip, along which lies a medium having ferromagnetic properties. In order to do so, one must take into account three media; the so-called space-ether, a conductive layer below the radiating antenna, and a magnetic medium below or at the same level of the conductive layer.

Because of the above, in order to investigate mathematically the performance of the above-mentioned artificial earth and cylindrical wave supporter, we can consider the case of a plane interface having a composite structure. It is true that a theory could be developed particularly to each of the above mentioned cases and in so doing for the cylindrical structure we would have to deal with cylindrical functions instead of trigonometric functions of the plane case.

Because of the fact that a plane wave supporter can be considered as the limit case of the cylinder having an infinite radius, the essential information about the operation of both types of wave supporters can be simultaneously reached by considering a plane wave supporter.

Considering that (1) the above-mentioned conducting and magnetic media act independently and that (2) the combined effect of the two metallic media would at least in some respect be equivalent to that of a single medium having a resulting or equivalent physical constants ($\mu$, $\epsilon$, $\sigma$), defined hereinafter, the analysis given hereinafter is carried out on the basis of propagation in free space in the presence of an assumed single medium. For convenience and simplicity of analysis, it is considered that the distribution of the ferromagnetic material lying under or beside the conductive strip is continuous. It will be readily apparent from the calculation for the continuous case that it is possible, if desired, and perhaps more economical in actual practice, to use an equivalent discontinuous distribution of the ferromagnetic material and/or a discontinuous distribution of the conductive strip, or, alternately, to provide in one or more of the above mentioned ways a single strip having both ferromagnetic and electrically conductive properties, conceptually.

(A) *Radiotransmission using a conductive and magneto reactive interface*

Starting from the well known Maxwell's equation, if (FIG. 1) $\overline{E}$ and $\overline{H}$ are respectively the electric and the magnetic vector pertaining to an electromagnetic wave, $\epsilon$, $\mu$, and $\sigma$, respectively the dielectric constant, the magnetic constant and the electric conductance of the medium and $t$ the time, one has $$\epsilon \frac{\delta \overline{E}}{\delta 3} + \sigma \overline{E} = \text{Curl } \overline{H}$$

$$-\mu \frac{\delta \overline{H}}{\delta t} = \text{Curl } \overline{E} \quad (5)$$

These equations are available, i.e., may be extended to each of the media constituting the parts of the system. It is legitimate to consider a constancy along the y-direction (FIG. 1) so that the terms with $\delta/\delta y$ are to be considered zero. The well known analogy between propagation of radiowave in homogeneous media and on uniform conductors, if one puts $\Delta = \delta/\delta t$ allows to consider a propagation parameter (symbolic):

$$\gamma = \sqrt{\mu \Delta (\sigma + \epsilon \Delta)} \quad (6)$$

supposing the function E(t) of the electric field to be a general physical function of $t$ and the parameters of the system independent on $t$. Assuming a sinusoidal force function of the time, with angular frequency $\omega$, is:

$$\gamma = j\mu\omega(\sigma + j\epsilon\omega) \quad (7)$$

The equations (5), supposing the upper medium the free space, after projection on the $x$, $y$, $z$ axis of FIG. 1 become:

$$\frac{\delta \overline{E}_z}{\delta_x} + \overline{\gamma}_0 E_x + j\mu_0 \omega H_y = 0$$

$$-j\omega\epsilon_0 E_x - \overline{\gamma}_0 H_y = 0 \qquad j\omega\epsilon_0 E_x + \frac{\delta H_y}{\delta x} = 0 \quad (8)$$

and after manipulation:

$$\frac{d^2 H_y}{dx^2} = -\overline{k}_0^2 H_y$$

with $$\overline{k}_0^2 = -(\overline{\gamma}_0^2 + \mu_0 \epsilon_0 \omega^2) \quad (9)$$

whose solution has the form:

$$H_y = Ce^{-\overline{k}_0 x}; \; C \text{ constant} \quad (10)$$

The instantaneous complex value is $$H_y = H_y e^{j\omega t - \overline{\gamma}_0 z} \quad (11)$$

The calculation of the same magnetic component inside the conductive-magneto reactive interface, with the initial assumptions, gives:

$$\frac{d^2 H^*_y}{dx^2} = \overline{k}^{*2} H^*_y \quad (9')$$

$$H_y = Ce^{-\overline{k}^* x} \quad (10')$$

$$H^*_y = H^* \cdot e^{-\overline{\gamma}_z + j\omega t} \quad (11')$$

where the constants are:

$$\overline{k}^{*2} = \overline{\gamma}^*_1{}^2 - \overline{\gamma}^{*2}; \; \overline{\gamma}^*_1 = (j\mu^*\omega(\sigma^* + j\epsilon^*\omega))^{1/2} \quad (12)$$

$$\overline{\gamma}_0 = (j\omega/v_0)\left(1 - j\frac{\mu^* \epsilon_0 \omega}{\mu_0 \sigma^*}\right)^{1/2} \quad (13)$$

$v_0$, light velocity and, as it arises from the sequel, $\gamma^* = \gamma_0$.

The constant $\overline{k}^*$ can be given the form:

$$\overline{k}^* = (\sqrt{\mu_r/v_0})\sqrt{\frac{j\sigma^*\omega}{\epsilon_0}} \quad (14)$$

$$\mu_r = \mu^*/\mu_0$$

The values of $E_x$ and $E^*_x$ in the z-direction (FIG. 1) considered respectively in the free space and below the interface, are:

In the free space $$E_x = -\frac{\overline{\gamma}_0}{j\epsilon_0\omega} H_y = -\frac{\overline{\gamma}_0 C}{j\epsilon_0\omega} e^{-\overline{k}_0 x} e^{j\omega t + \overline{\gamma}_0 z} \quad (15)$$

Below the interface $$E^*_x = -\frac{\overline{\gamma}^*}{\sigma^* + j\epsilon^*\omega} H^*_y = -\frac{\overline{\gamma}^* C}{\sigma^* + j\epsilon^*\omega} e^{\overline{k}^* x} e^{-\overline{\gamma}^*_z + j\omega t} \quad (16)$$

At the interface ($x = o$), as for the principle of continuity at the boundary, the fields $E_x$ and $E^*_x$ must coincide and one obtains $$\overline{\gamma}^* = \overline{\gamma}_0 \quad (17)$$

This condition holds for whatever type of interface between adjacent media.

It should be noted that all above mentioned primary parameters characteristic of the conductive and magneto reactive interface have to be properly determined, e.g., by applying a special criterion of weighted average taking into account the relative widths of conductive and magneto reactive strips in a given portion of interface.

(B) *Radiotransmission on a purely conductive interface*

In the free space $$H_y = Ce^{-k'_0 x} \cdot e^{j\omega t - \gamma'_0 z} \quad (18)$$

$$E_x = -\frac{\overline{\gamma}_0 C}{j\epsilon_0\omega} e^{-\overline{k}'_0 x} \cdot e^{-\overline{\gamma}_0 z + j\omega t} \quad (19)$$

$$\overline{\gamma}'_0 = \sim (j\omega/v_0)\left[1 - \frac{j\epsilon_0\omega}{\sigma'}\right]^{1/2} \quad (20)$$

$$\overline{k}'_0 = -j\epsilon_0\omega \left[\frac{j\mu_0\omega}{\sigma}\right]^{1/2} \quad (21)$$

with:
being $\sigma'$, $\gamma_0'$ and $k'_0$ relative to the conductive interface.

Below the interface $$H'_y = Ce^{\overline{k}'_1 x} \cdot e^{j\omega t - \overline{\gamma}'_0 z} \quad (22)$$

$$E'_x = -\frac{\overline{\gamma}'_0}{\sigma' + j\epsilon'\omega} H'_y = -\frac{\overline{\gamma}' C}{\sigma'_1 + j\epsilon'_1\omega} e^{\overline{k}'_1 x} e^{-\overline{\gamma}'_{1z} + j\omega t} \quad (23)$$

$$\bar{\gamma}'_1 = \bar{\gamma}'_0 \quad (24)$$

$$\bar{k}'_1 = (1/v_0)\sqrt{\frac{j\sigma'\omega}{\epsilon_0}} \quad (25)$$

The characteristic equations of the electromagnetic field with the hypothesis that dielectric constant of the guiding surface is the same as the permittivity of the free space (i.e., $\epsilon^* = \epsilon_0$) can be given the form:

(a) In free space (outside the magneto-conductive guide):

$$E_x = \bar{E}_{x0} \exp(-\bar{K}_0 x) \exp(j(\omega t - \gamma_0 z)) \quad (26)$$

$$E_z = \bar{E}_{z0} \exp(-\bar{K}_0 x) \exp(j(\omega t - \gamma_0 z)) \quad (27)$$

(b) Within the guiding magneto-conductive body:

$$E^*_x = \bar{E}^*_{x0} \exp(\bar{K}^* x) \exp(j(\omega t - \gamma_0 z)) \quad (28)$$

$$E^*_z = \bar{E}^*_{z0} \exp(\bar{K}^* x) \exp(j(\omega t - \gamma_0 z)) \quad (29)$$

where $E_x$, $E_z$, $E^*_x$, $E^*_z$ are instantaneous complex values. The complex magnitudes $\bar{E}_{x0}$, $\bar{E}_{z0}$, $\bar{E}^*_{x0}$, $\bar{E}^*_{z0}$ are dependent upon the launching system, the physical constants involved, and the frequency of the impressed wave.

Putting:

$$\bar{\gamma}_0 = \bar{\gamma}^* = \alpha + j\beta \quad (30)$$
$$\bar{K}_0 = a + jb \quad (31)$$
$$\bar{K}^* = a^* + jb^* \quad (32)$$

as respectively the parameters of propagation along the $z$-direction ($\bar{\gamma}$ and $\bar{\gamma}^*$) and along the $x$-direction ($\bar{K}_0$ and $\bar{K}^*$), after some manipulations one deduces the values of $\alpha$, $\beta$, $a$, $b$, $a^*$, $b^*$ and one is led to the following conclusions:

(1) the expression of $\beta$ is found to be:

$$\beta = \frac{\omega}{v_0}\sqrt{1 + \mu_r^2 \frac{\epsilon_0^2 \omega^2}{4\sigma^{*2}}} \quad (33)$$

and shows that increasing the relative magnetic permeability of the guiding surface, i.e. $\mu_r$, acts to obtain values of the phase velocity smaller than that of the light velocity.

(2) The tilting angle of the effective axis of propagation, complementary to the slope of the wave front is found to be:

$$\psi = tg^{-1}\frac{1}{\sqrt{\mu_r}}\sqrt{\frac{2\sigma^*}{\omega\epsilon_0}} \quad (34)$$

and appears to be larger than that pertaining to the case of a pure conductive interface, but slightly larger.

(3) The decay-longitudinal coefficient $\alpha$, which is found to be:

$$\alpha = \frac{\omega}{2v_0}\mu_r\frac{\epsilon_0\omega}{\sigma^*} \quad (35)$$

does not sensibly increase if one employs a magnetic permeability of the guiding surface having low values along the $z$-axis.

(4) The radial-decay coefficient $a$, which is found to be:

$$a = \frac{1}{\sqrt{2}}\sqrt{\mu_r}\frac{\omega}{v_0}\sqrt{\frac{\epsilon_0\omega}{\sigma^*}} \quad (36)$$

can be selected conveniently high by employing a magnetic material which has high values of the permeability along the $x$-axis.

It should be noted that in order to achieve the opportunities mentioned under (3) and (4), it is convenient to employ materials having directional permeability, as for example, special ferrites for the magneto-reactive portion of the wave supporter.

(5) The aforementioned statements though demonstrated for plane wave guides appear to be also significant for cylindrical open wave guides, remembering that a plane interface can be conceived as the limit of a cylindrical surface when the radius increases.

While the present invention has been described in its preferred embodiment, it is realized that modifications may be made, and it is desired that it be understood that no limitations on the invention are intended other than may be imposed by the scope of the appended claims.

It is to be emphasized that my artificial earth in any of its forms with its electric and magnetic properties as described herein in conjunction with all properties arising from the other parts of my invention develops a magnified action of guidance, reinforcement and binding of the energy carried by an electromagnetic surface wave in the desired direction of transmission.

Having now disclosed my invention, what I claim as new and desire to secure by Letters Patent of the United States is:

1. An elongated open wave guide for transmitting high frequency electromagnetic energy in a desired direction comprising:
    (a) an external conductive surface extending longitudinally in the direction of axial propagation of the electrical energy, said surface providing a conductive action to regulate the attenuation of the Poynting vector in the desired direction of propagation;
    (b) magnetic means disposed in close proximity to said external surface for providing independent of said transmitted electromagnetic energy a magnetic action to regulate the attenuation of the Poynting vector in the desired direction of propagation whereby the phase velocity of the wave is less than the velocity of light and the transmitted electrical energy is directed along and maintained in close proximity and substantially non-radiating to said external surface throughout the length of said surface of said open wave guide.

2. An elongated open wave guide for directing and confining the propagation of transmitted high frequency electromagnetic energy in a desired direction comprising:
    (a) an electrically conductive surface extending longitudinally in the direction of axial propagation of the electrical energy, said surface providing a conductive action to regulate the attenuation of the Poynting vector in the desired direction of propagation.
    (b) ferromagnetic means disposed in close proximity to said conductive surface for providing a magnetic action to regulate the attenuation of the Poynting vector in the desired direction of propagation whereby the phase velocity of the wave is less than the velocity of light and the transmitted electrical energy is directed along and maintained in close proximity and substantially non-radiating to said conductive surface throughout the length of said surface of said open wave guide.

3. The open wave guide of claim 2 wherein;
    (a) said ferromagnetic means is disposed transversely to said direction of energy propagation.

4. The open wave guide of claim 2 wherein;
    (a) said ferromagnetic means is disposed longitudinally to said direction of energy propagation.

5. An open wave guide for propagating high frequency electromagnetic energy in a desired direction comprising an electrically non-continuous conductive plane body having non-conductive ridges therein, strips of magnetic materials positioned beneath said ridges in close proximity thereto, said ridges being transversely directed with respect to the desired direction of propagation whereby the phase velocity of the wave is less than the velocity of light and the transmitted electrical energy is directed along and maintained in close proximity and substantially non-radiating to said plane body throughout the length of said plane body.

6. An open wave guide useful for transmitting high frequency electrical energy, said wave guide having an external cylindrical surface extending longitudinally in the desired direction of propagation of said energy, and said surface including a portion having selected ferromagnetic properties and a portion having selected conductive properties, said respective ferromagnetic and conductive portions being longitudinally disposed, and being located adjacent to each other to provide a resulting selected attenuation for the electrical energy in the longitudinal direction and a different selected attenuation for the same energy in all directions substantially perpendicular to said longitudinal direction whereby the phase velocity of the wave is less than the velocity of light and the transmitted energy is guided along and maintained in close proximity and substantially non-radiating to the surface throughout the extent of said open wave guide.

7. An open wave guide useful for transmitting high frequency electrical energy, said wave guide having an external cylindrical surface whose longitudinal axis extends in the desired direction of propagation of said energy said external surface including portions having selected ferromagnetic properties and portions having selected conductive properties, both of said portions extending alternately around the circumference in strips adjacent to each other and generally directed along the axis of said external surface, and being effectively operable to provide relatively low attenuation of electrical energy in the desired direction of propagation and relatively high attenuation of said energy in all radial directions which are perpendicular to the direction of the desired propagation, whereby the phase velocity of the wave is less than the velocity of light and the high frequency electrical energy is guided along and maintained in close proximity and substantially non-radiating to said external surface throughout its extension of said open wave guide.

8. An open wave guide according to the claim 7, wherein said external surface includes a plurality of ferromagnetic portions and a plurality of conductive portions directed parallel to the axis of the external surface throughout the length thereof.

9. An open wave guide according to claim 7, wherein each magnetic portion is a strip of material having selected ferromagnetic properties and each conductive portion is a strip of selected conductive material, said strips extending in the form of a helix along the longitudinal axis of said open wave guide and throughout the length of said open wave guide.

10. An open wave guide useful for transmitting high frequency electrical energy, said wave guide having a cylindrical interface whose longitudinal axis extends in the desired direction of propagation of said energy said interface including portions having selected ferromagnetic properties and portions having selected conductive properties, both of said portions extending along the axis of said interface, being located adjacent to each other in the axial direction, and being effective to provide a selected attenuation of electrical energy in the desired direction of propagation and a selected attenuation of a different magnitude of said energy in all radial directions which are perpendicular to the direction of the desired propagation, whereby the phase velocity of the wave is less than the velocity of light and the high frequency electrical energy is guided along and maintained in close proximity and substantially non-radiating to said interface throughout the extent of said open wave guide.

11. The open wave guide of claim 10 wherein said ferromagnetic portion and said conductive portion are helically disposed in the axial direction.

UNITED STATES PATENTS

References Cited by the Examiner

| | | | |
|---|---|---|---|
| 2,122,893 | 7/1938 | Roosenstein | 343—787 |
| 2,929,034 | 3/1960 | Doherty | 333—96 X |
| 3,077,569 | 2/1963 | Ikrath | 343—785 X |

HERMAN KARL SAALBACH, *Primary Examiner.*